United States Patent
Judd et al.

(10) Patent No.: US 9,394,827 B2
(45) Date of Patent: Jul. 19, 2016

(54) INLET PARTICLE SEPARATOR SYSTEM WITH FLOW PASSAGE THROUGH HUB AND/OR SHROUD

(71) Applicant: HONEYWELL INTERNATIONAL INC., Morristown, NJ (US)

(72) Inventors: Zedic Daniel Judd, Phoenix, AZ (US); Yogendra Yogi Sheoran, Scottsdale, AZ (US); Devinder N. Katariya, Chandler, AZ (US); Eduardo Guerra, Queen Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 380 days.

(21) Appl. No.: 13/961,284

(22) Filed: Aug. 7, 2013

(65) Prior Publication Data

US 2015/0040535 A1    Feb. 12, 2015

(51) Int. Cl.
    *F02C 7/05* (2006.01)
    *F02C 7/052* (2006.01)
    *B64D 33/02* (2006.01)

(52) U.S. Cl.
CPC . *F02C 7/05* (2013.01); *F02C 7/052* (2013.01); *B64D 2033/0246* (2013.01); *F05D 2260/607* (2013.01); *Y02T 50/675* (2013.01)

(58) Field of Classification Search
CPC ...... F02C 7/05; F02C 7/052; F05D 2260/607; B64D 2033/0246

USPC .................................................. 55/306, 385.3
See application file for complete search history.

(56) References Cited

U.S. PATENT DOCUMENTS

| | | | |
|---|---|---|---|
| 4,250,703 A | 2/1981 | Norris et al. | |
| 4,928,480 A | 5/1990 | Oliver et al. | |
| 6,499,285 B1 | 12/2002 | Snyder | |
| 6,698,180 B2 * | 3/2004 | Snyder | B01D 45/08 137/15.1 |
| 6,702,873 B2 | 3/2004 | Hartman | |
| 7,596,938 B2 | 10/2009 | Bart et al. | |
| 7,608,122 B2 * | 10/2009 | Snyder | F02C 7/052 55/306 |
| 7,927,408 B2 | 4/2011 | Sheoran et al. | |
| 8,015,787 B2 | 9/2011 | Snyder | |
| 2010/0162682 A1 | 7/2010 | Lerg | |

\* cited by examiner

*Primary Examiner* — Phutthiwat Wongwian
*Assistant Examiner* — Marc Amar
(74) *Attorney, Agent, or Firm* — Ingrassia Fisher & Lorenz, P.C.

(57) ABSTRACT

An inlet particle separator system for a vehicle engine includes a hub section, a shroud section, a splitter, and a hub suction flow passage. The shroud section surrounds at least a portion of the hub section and is spaced apart therefrom to define a main flow passageway that has an air inlet. The splitter is disposed downstream of the air inlet and extends into the passageway to divide the main flow passageway into a scavenge flow path and an engine flow path. The hub suction flow passage has a hub suction inlet port and a hub suction outlet port. The hub suction inlet port extends through the hub section and is in fluid communication with the air inlet. The hub suction outlet port extends through the splitter and is in fluid communication with the scavenge flow path.

18 Claims, 6 Drawing Sheets

INLET PARTICLE SEPARATOR SYSTEM WITH FLOW PASSAGE THROUGH HUB AND/OR SHROUD

STATEMENT REGARDING FEDERALLY SPONSORED RESEARCH OR DEVELOPMENT

This invention was made with Government support under W911W6-08-2-0001 awarded by the Army AATD. The Government has certain rights in the invention.

TECHNICAL FIELD

The present invention generally relates to an inlet particle separator system for a vehicle engine, and more particularly relates to an inlet particle separator system with hub and/or shroud suction to improve fine particulate separation efficiency.

BACKGROUND

During operation of an aeronautical vehicle, air is induced into an engine and, when mixed with a combustible fuel, is used to generate energy to propel the vehicle. The induced air may contain undesirable particles, such as sand and dust, which can degrade engine components. In order to prevent or at least minimize such degradation, many aeronautical vehicles use an inlet particle separator system, disposed upstream of the engine, to remove at least a portion of the undesirable particles.

A conventional inlet particle separator typically includes a duct system having a fluid passageway that transitions into a scavenge flow path and an engine flow path. Air that is induced into the fluid passageway may have particles suspended therein. The inertia of relatively larger ones of the suspended particles tends to cause these particles to travel in a straight line rather than follow the fluid passageway. Because of the manner in which the inlet particle separator is configured, most of the suspended particles tend to flow into the scavenge flow path rather curve into the engine flow path. As such, relatively clean air is directed into the engine, and contaminated air, which has the particles suspended therein, is directed through the scavenge flow path and is discharged.

Conventional inlet particle separators, such as those described above, operate at relatively high efficiencies for relatively large particles (e.g., >80 microns). However, for relatively small particles (e.g., <80 microns), the efficiencies can be relatively low, resulting in a significant amount of these relatively small particles being ingested into the engine. These relatively small particles, while being potentially less troublesome than the relatively large particles, can still have some deleterious effects. For example, these particles can plug secondary flow lines and/or can melt and form glass on relatively hot engine components, such as the combustor, which can significantly reduce engine performance or have other undesirable effects.

Hence, there is a need for an inlet particle separator system that increases the separation efficiency of relatively small particles from engine inlet air without increasing core pressure loss. The present invention addresses at least this need.

BRIEF SUMMARY

In one embodiment, an inlet particle separator system for a vehicle engine includes a hub section, a shroud section, a splitter, and a hub suction flow passage. The shroud section surrounds at least a portion of the hub section and is spaced apart therefrom to define a main flow passageway that has an air inlet. The splitter is disposed downstream of the air inlet and extends into the passageway to divide the main flow passageway into a scavenge flow path and an engine flow path. The hub suction flow passage has a hub suction inlet port and a hub suction outlet port. The hub suction inlet port extends through the hub section and is in fluid communication with the air inlet. The hub suction outlet port extends through the splitter and is in fluid communication with the scavenge flow path.

In another embodiment, an inlet particle separator system for a vehicle engine includes a hub section, a shroud section, a splitter, a shroud suction flow passage, and a shroud section scoop. The shroud section surrounds at least a portion of the hub section and is spaced apart therefrom to define a main flow passageway that has an air inlet. The splitter is disposed downstream of the air inlet and extends into the passageway to divide the main flow passageway into a scavenge flow path and an engine flow path. The shroud suction flow passage has a shroud suction inlet port and a shroud suction outlet port. The shroud suction inlet port extends through the shroud section and is in fluid communication with the separation section. The shroud suction outlet port is in fluid communication with the scavenge flow path. The shroud section scoop extends from the shroud section and is disposed adjacent the shroud suction inlet port.

In yet another embodiment, an inlet particle separator system for a vehicle engine includes a hub section, a shroud section, a splitter, a shroud suction flow passage, and a hub suction flow passage. The shroud section surrounds at least a portion of the hub section and is spaced apart therefrom to define a main flow passageway that has an air inlet. The splitter is disposed downstream of the air inlet and extends into the passageway to divide the main flow passageway into a scavenge flow path and an engine flow path. The shroud suction flow passage has a shroud suction inlet port and a shroud suction outlet port. The shroud suction inlet port extends through the shroud section and is in fluid communication with the separation section. The shroud suction outlet port is in fluid communication with the scavenge flow path. The hub suction flow passage has a hub suction inlet port and a hub suction outlet port. The hub suction inlet port extends through the hub section and is in fluid communication with the air inlet. The hub suction outlet port extends through the splitter and is in fluid communication with the scavenge flow path.

Furthermore, other desirable features and characteristics of the inlet particle separator system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
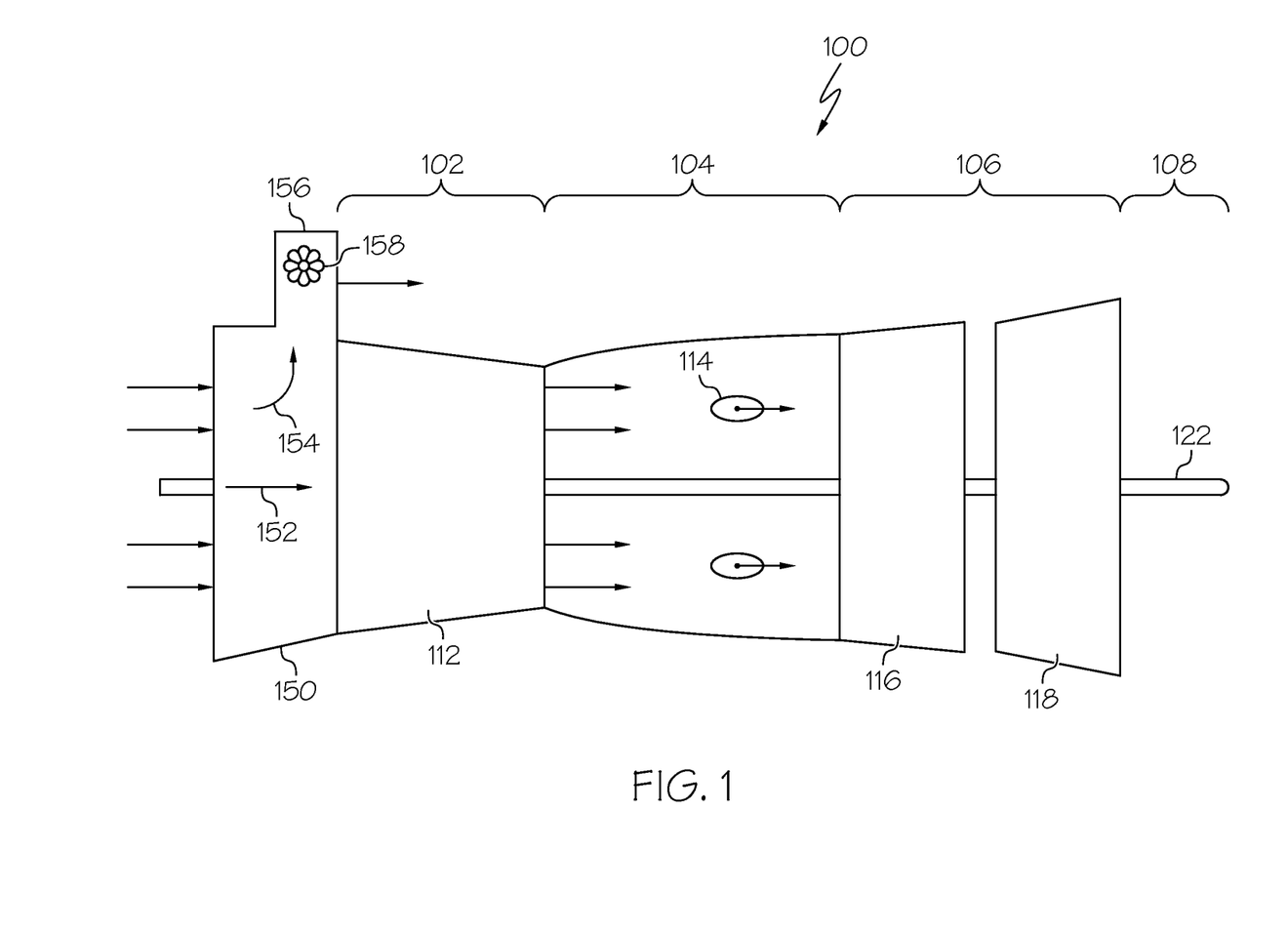
FIG. 1 is a functional block diagram of an exemplary gas turbine engine.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102, which may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 104. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high pressure turbine 116 and a low power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 108. The power shaft 122 may be used to drive various devices within the engine or vehicle. For example, in the context of a helicopter, the power shaft may be used to drive one or more rotors.

As FIG. 1 further depicts, the gas turbine engine 100 also includes an inlet particle separator system 150. The inlet particle separator system 150 is coupled to, and disposed upstream of, the compressor section 102. The air that the compressor section 102 draws into the engine 100 first enters the inlet particle separator system 150. The inlet particle separator system 150, as will be described in more detail further below, is configured to separate the air that is drawn into the engine 100 into compressor inlet air 152 and scavenge air 154. The compressor inlet air 152 is drawn into the compressor section 102, and the scavenge air 154 is drawn into, for example, a scavenge scroll 156 via, for example, an air pump 158 (e.g., a blower or the like), and is then discharged into the atmosphere. The particle separator system 150 is additionally configured such that at least a portion of any particulate that is suspended in the air that is drawn into the engine 100 is separated therefrom and is discharged with the scavenge air 154. Thus, the compressor inlet air 152 that is drawn into the compressor section 102 is relatively clean, particulate free air.

Figure 2:
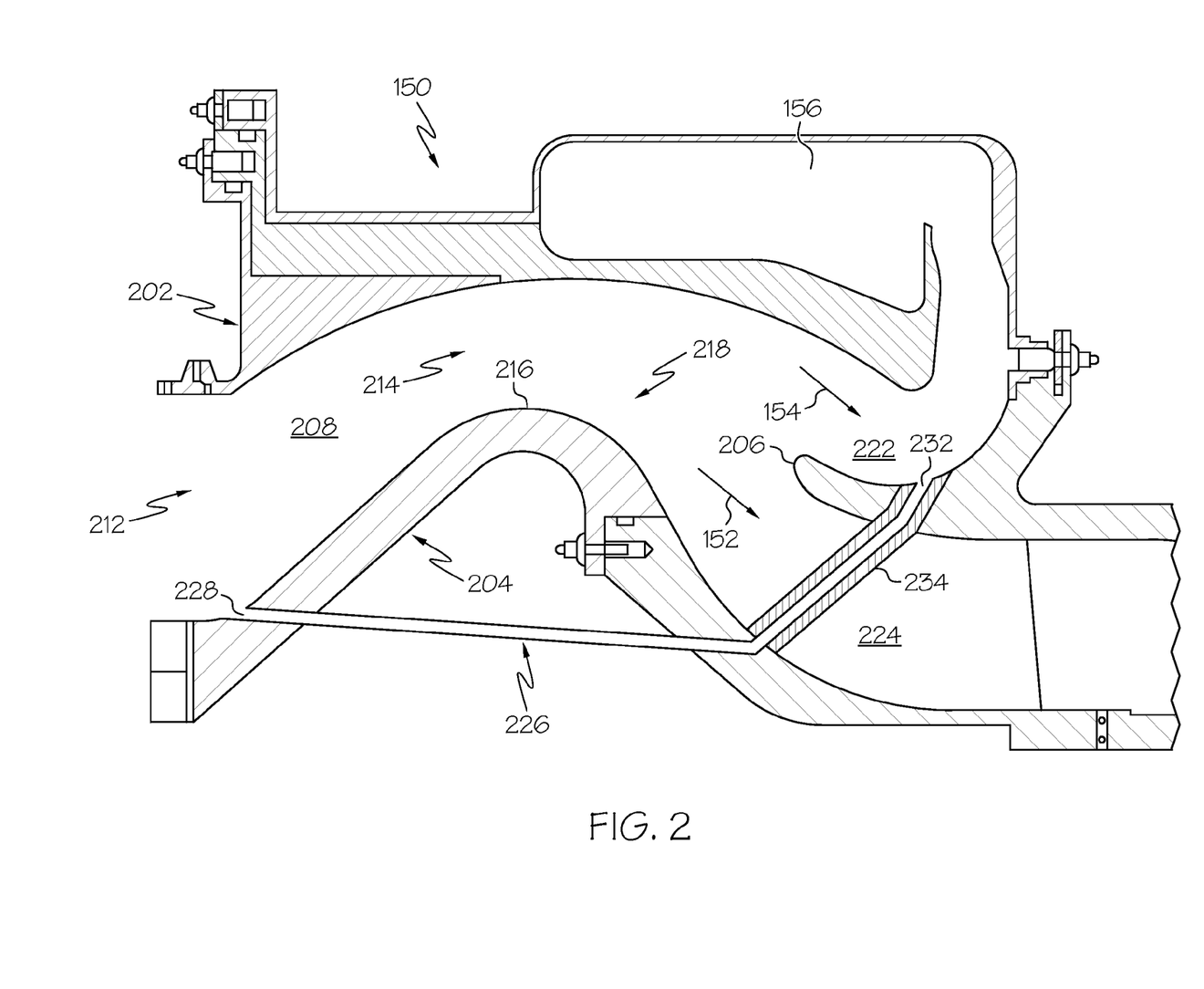
FIGS. 2-6 are partial cross-sectional views of various embodiments of an inlet particle separator system that may be implemented in the gas turbine engine of FIG. 1.

Referring now to FIG. 2, a cross section view of portions of the inlet particle separator system 150 is depicted and will be described. The inlet particle separator system 150 includes a shroud section 202, a hub section 204, and a splitter 206. The shroud section 202 surrounds at least a portion of the hub section 204 and is spaced apart therefrom to define a passageway 208 having an air inlet 212. The air inlet 212 is configured to receive the air that is drawn into the engine 100.

The shroud section 202 and the hub section 204 are configured such that the cross sectional flow area of the passageway 208 decreases downstream of the air inlet 212 to define a throat section 214. The shroud section 202 and hub section 204 may be variously configured to implement this functionality, but in the depicted embodiment the outer diameter of the hub section 204 gradually increases downstream of the air inlet 212 to define the throat section 214 at a point of maximum diameter 216. As FIG. 2 depicts, the diameter of the hub section 204 then decreases downstream of the throat section 214, to define what is referred to herein as the separation section 218.

The separation section 218 is where the air that is drawn into the engine 100, and more specifically the air that is drawn into the air inlet 212, is separated into the compressor inlet air 152 and the scavenge air 154. The separation section 218 is also where the splitter 206 is disposed. In particular, the splitter 206 extends into the passageway 208 downstream of the air inlet 212, and more specifically downstream of the throat section 214, and divides the passageway 208 into a scavenge flow path 222, into which the scavenge air 154 flows, and an engine flow path 224, into which the compressor inlet air 152 flows.

As is generally known, air that is drawn into the engine 100 may have particles entrained therein. Due to their inertia, relatively larger (e.g., >80 microns) entrained particles will tend to collect adjacent the shroud section 202, and will thus flow with the scavenge air 154 into the scavenge flow path 222. As previously noted, the scavenge air 154 is drawn into the scavenge scroll 156 via the air pump 158 and is then discharged into the atmosphere. The compressor inlet air 152, which has none (or at least very few) relatively large particles entrained therein, flows into the engine flow path 224, and ultimately into the compressor section 102 (not depicted in FIG. 2).

It was noted above that, at least in some instances, relatively small entrained particles (e.g., <80 microns) can flow with the compressor inlet air 152 into the engine flow path 224, and thus be ingested into the engine. To prevent, or at least inhibit, a large portion of the relatively small particles from flowing into the compressor section 102, the depicted inlet particle separator system 150 includes a hub suction flow passage 226. The hub suction flow passage 226 includes a hub suction inlet port 228 and a hub suction outlet port 232. The hub suction inlet port 228 extends through the hub section 204 and is in fluid communication with the air inlet 212. The hub suction outlet port 232 extends through the splitter 206 and is in fluid communication with the scavenge flow path 222.

The hub suction inlet port 228 may be variously disposed on the hub section 204. In the embodiment depicted in FIG. 2, the hub suction inlet port 228 is disposed adjacent the air inlet 212. In other embodiments, such as the one depicted in FIG. 3, the hub suction inlet port 228 is disposed downstream of the air inlet 212 and upstream of the throat section 214. In the embodiment depicted in FIG. 3, the inlet particle separator system 150 may also include a hub scoop 302. The hub scoop 302, if included, extends from the hub section 204 and is disposed adjacent the hub suction inlet port 228. The hub scoop 302 is configured to further encourage flow adjacent the hub section 204 into the hub section inlet port 228, and its downstream side is preferably configured as a faring to transition smoothly to the hub surface. It will be appreciated that in both of these embodiments, the air pump 158 is additionally configured to draw air into and through the hub suction flow passage 226.

Figure 3:
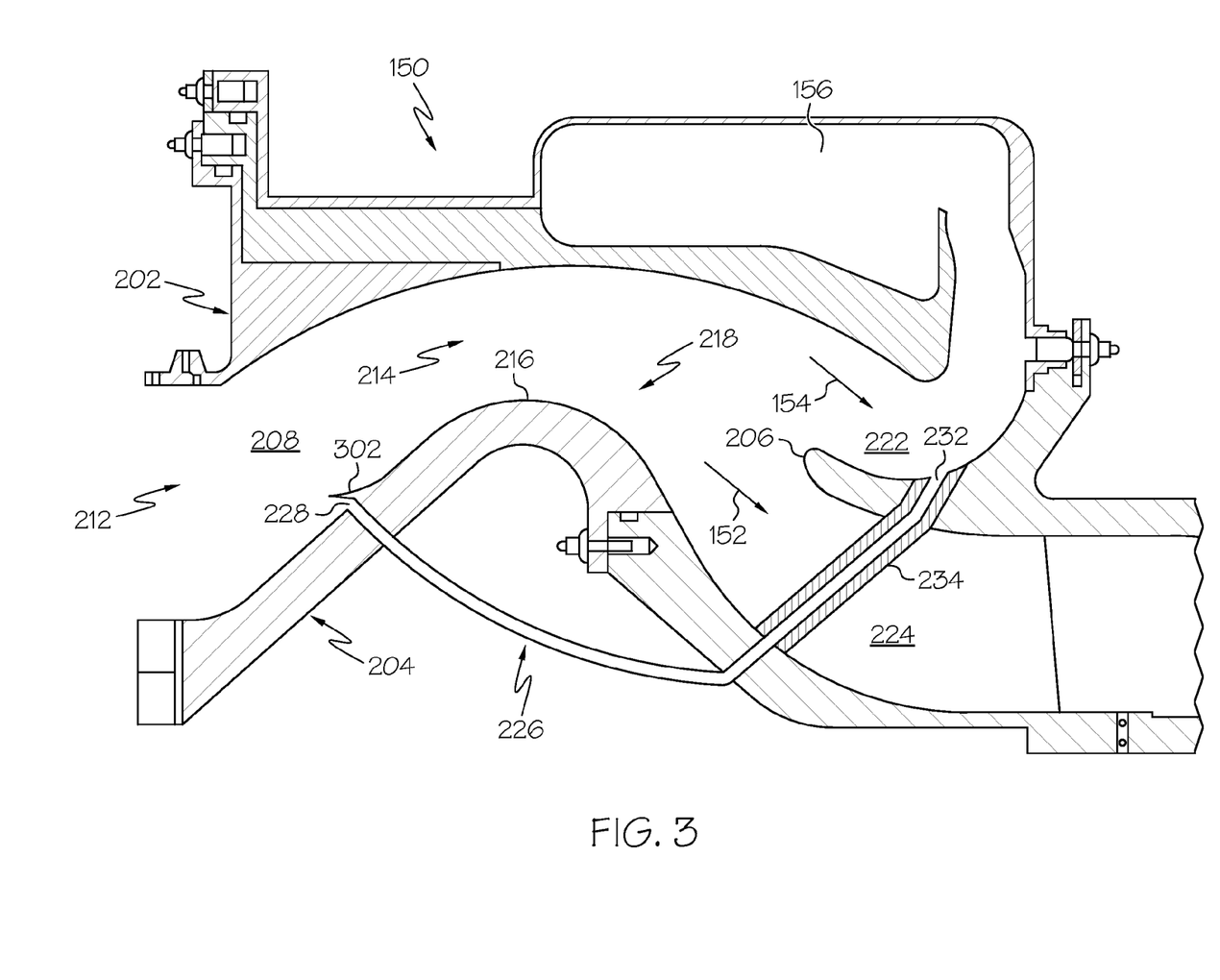

It should be noted that the hub suction flow passage 226 is depicted as traversing the engine flow path 224 before extending through the splitter 206. This is made possible, in most embodiments, via one or more support struts 234 that are used to support the hub section 204 and the splitter 206. The hub suction flow passage 226 is preferably formed in and extends through, one or more of these struts 234.

Figure 4:
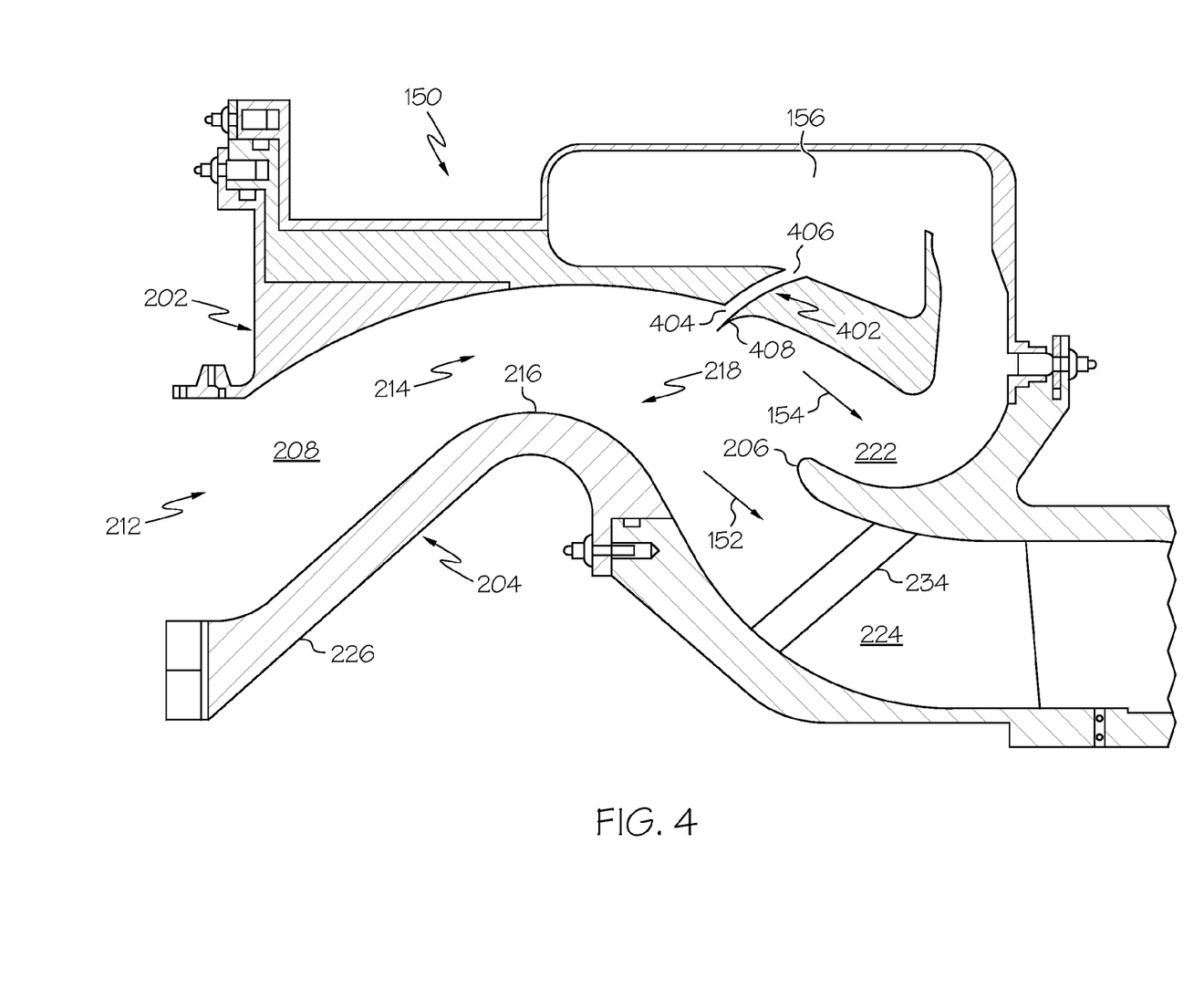

With reference now to FIG. 4, in some embodiments, the inlet particle separator system 150 may include a shroud suction flow passage instead of a hub suction flow passage 226. The shroud suction flow passage 402 includes a shroud suction inlet port 404 and a shroud suction outlet port 406. The shroud suction inlet port 404 extends through the shroud section 202 and is in fluid communication with the separation section 218, and the shroud suction outlet port 406 is in fluid communication with the scavenge flow path 222. Preferably, the shroud suction outlet port 406 is in fluid communication with the scavenge scroll 156. The embodiment depicted in FIG. 4 also includes a shroud scoop 408. The shroud scoop 408 extends from the shroud section 202 and is disposed adjacent the shroud suction inlet port 404. The shroud scoop 408 is configured to further encourage flow adjacent the shroud section 202 into the shroud section inlet port 404, and its downstream side is preferably configured as a faring to transition smoothly to the hub surface. As with the embodiments depicted in FIGS. 2 and 3, it will be appreciated that the air pump 158 is additionally configured to draw air into and through the shroud suction flow passage 402.

Figure 5:
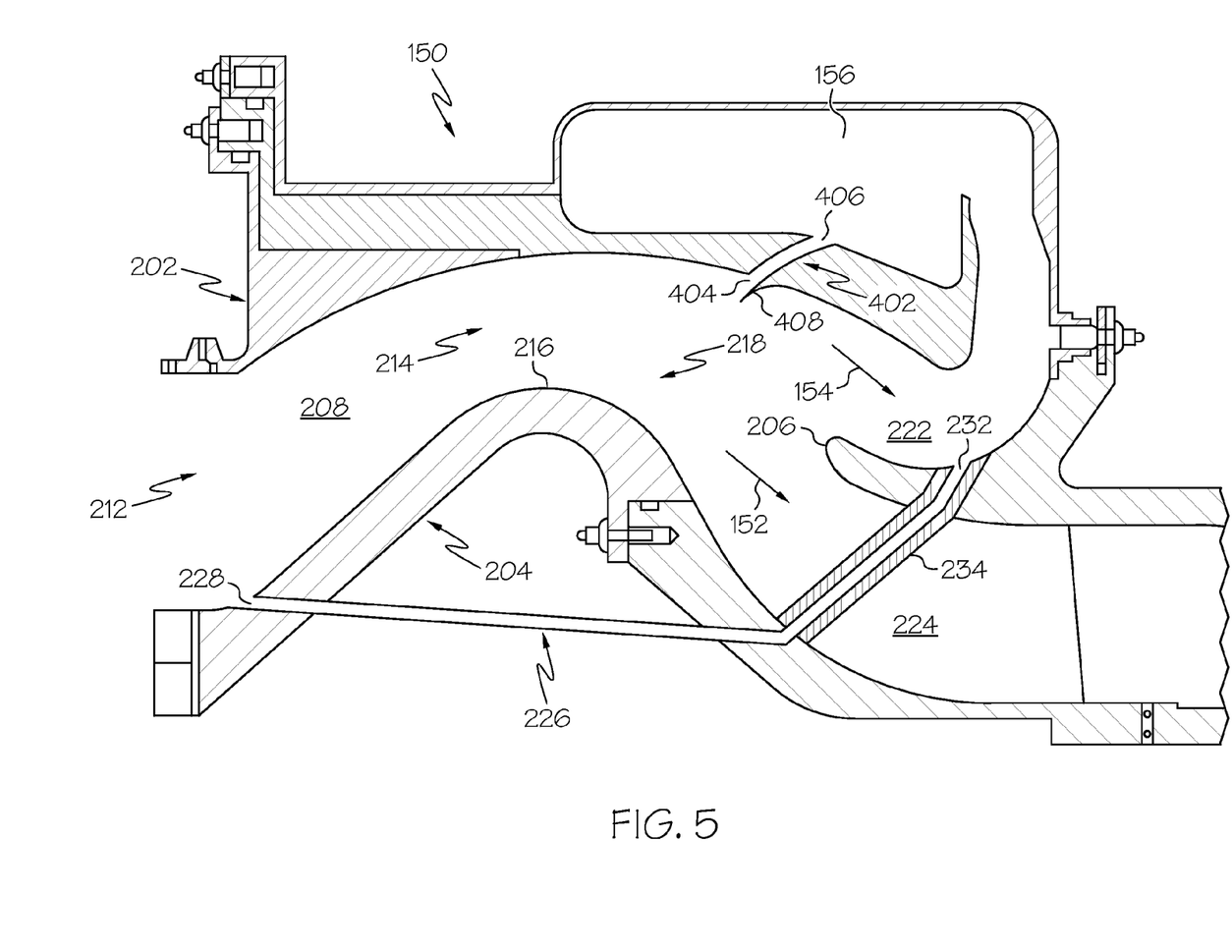
Figure 6:
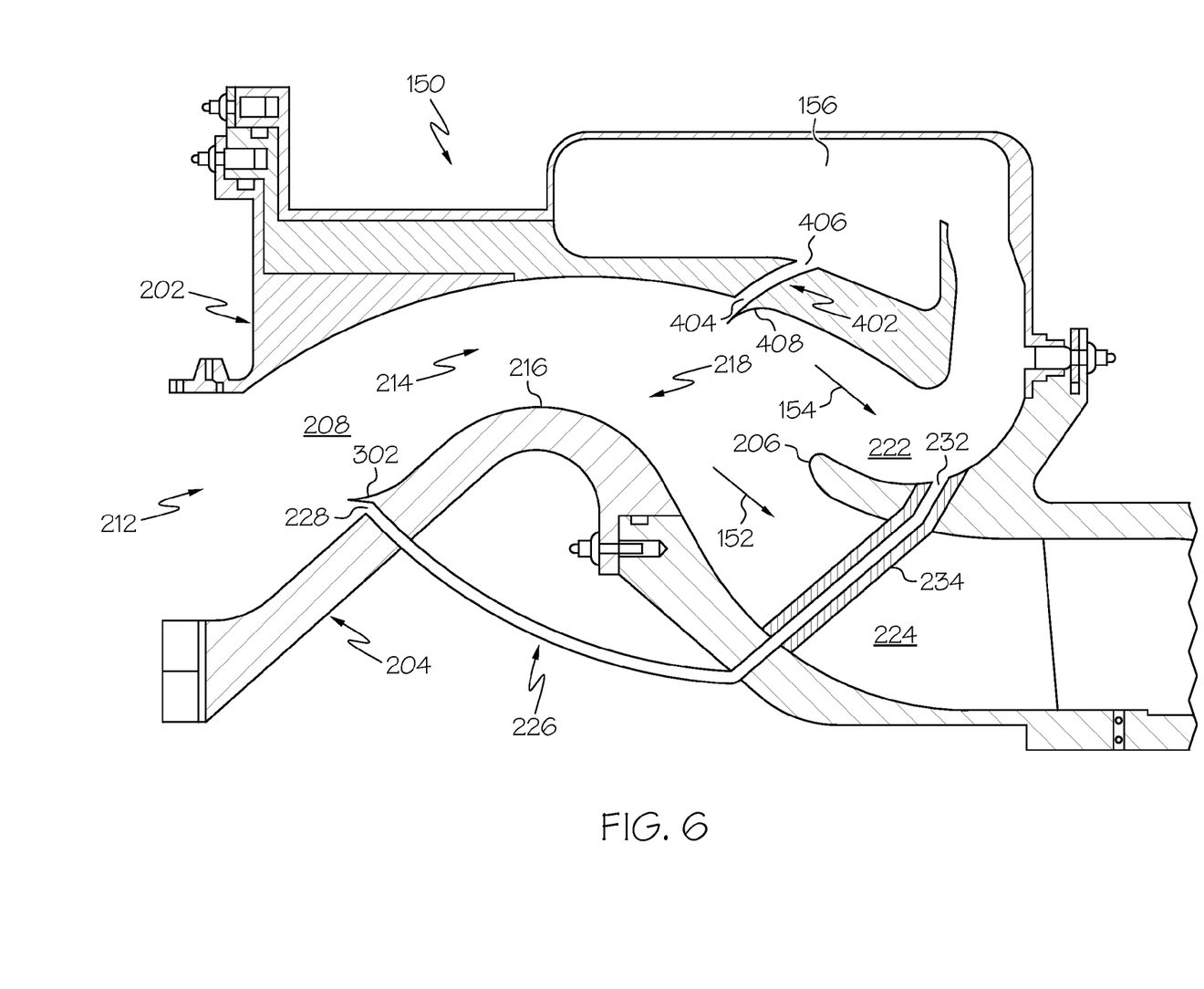

The embodiments depicted in FIGS. 2 and 3 include only a hub suction flow passage 226, and the embodiment depicted in FIG. 4 includes only a shroud suction flow passage 402. It will be appreciated that some embodiments may include both a hub suction flow passage 226 and a shroud suction flow passage 402. Two example embodiments are depicted in FIGS. 5 and 6. The reference numerals in FIGS. 5 and 6 correspond to like components depicted in FIGS. 2-4, and the configuration and implementation of these components is the same as previously described. As such, a detailed description of the embodiments depicted in FIGS. 5 and 6 need not, and will not, be provided.

The inlet particle separator systems 150 described herein increase the separation efficiency of relatively small particles from engine inlet air without increasing (or at least significantly impacting) core pressure loss.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet particle separator system for a vehicle engine, comprising:
   a hub section;
   a shroud section surrounding at least a portion of the hub section and spaced apart therefrom to define a main flow passageway, the main flow passageway having an air inlet and a cross sectional flow area, wherein the shroud section and the hub section are configured such that the cross sectional flow area of the main flow passageway decreases downstream of the air inlet to define a throat section and then increases downstream of the throat section to define a separation section;
   a splitter disposed downstream of the throat section and extending into the separation section to divide the main flow passageway, downstream of the throat section, into a scavenge flow path and an engine flow path; and
   a hub suction flow passage having a hub suction inlet port and a hub suction outlet port, the hub suction inlet port disposed upstream of the throat section and extending through the hub section and in fluid communication with the air inlet, the hub suction outlet port extending through the splitter and in fluid communication with the scavenge flow path.

2. The system of claim 1, wherein the hub section inlet port is disposed adjacent the air inlet.

3. The system of claim 1, wherein
   the hub suction inlet port is disposed downstream of the air inlet.

4. The system of claim 3, further comprising a hub section scoop extending from the hub section and disposed adjacent the hub suction inlet port.

5. The system of claim 1, further comprising an air pump in fluid communication with the scavenge flow path and configured to draw air through the scavenge flow path and the hub suction flow passage.

6. The system of claim 1, further comprising:
   a shroud suction flow passage having a shroud suction inlet port and a shroud suction outlet port, the shroud suction inlet port extending through the shroud section and in fluid communication with the separation section, the shroud suction outlet port in fluid communication with the scavenge flow path; and
   a shroud section scoop extending from the shroud section and disposed adjacent the shroud suction inlet port.

7. An inlet particle separator system for a vehicle engine, comprising:
   a hub section;
   a shroud section surrounding at least a portion of the hub section and spaced apart therefrom to define a main flow passageway, the main flow passageway having an air inlet and a cross sectional flow area, wherein the shroud section and the hub section are configured such that the cross sectional flow area of the main flow passageway decreases downstream of the air inlet to define a throat section and then increases downstream of the throat section to define a separation section;
   a splitter disposed downstream of the throat section and extending into the separation section to divide the main flow passageway, downstream of the throat section, into a scavenge flow path and an engine flow path;
   a shroud suction flow passage having a shroud suction inlet port and a shroud suction outlet port, the shroud suction inlet port extending through the shroud section and in fluid communication with the separation section, the shroud suction outlet port in fluid communication with the scavenge flow path;
   a shroud section scoop extending from the shroud section and disposed adjacent the shroud suction inlet port; and
   a hub suction flow passage having a hub suction inlet port and a hub suction outlet port, the hub suction inlet port disposed upstream of the throat section.

8. The system of claim 7, further comprising an air pump in fluid communication with the scavenge flow path and configured to draw air through the scavenge flow path and the shroud suction flow passage.

9. The system of claim 7, wherein: the hub suction inlet port extends through the hub section and is in fluid communication with the air inlet, and the hub suction outlet port extends through the splitter and is in fluid communication with the scavenge flow path.

10. The system of claim 9, wherein the hub section inlet port is disposed adjacent the air inlet.

11. The system of claim 9, wherein
the hub suction inlet port is disposed downstream of the air inlet.

12. The system of claim 11, further comprising a hub section scoop extending from the hub section and disposed adjacent the hub suction inlet port.

13. The system of claim 9, further comprising an air pump in fluid communication with the scavenge flow path and configured to draw air through the scavenge flow path, the shroud suction flow passage, and the hub suction flow passage.

14. An inlet particle separator system for a vehicle engine, comprising:
a hub section;
a shroud section surrounding at least a portion of the hub section and spaced apart therefrom to define a main flow passageway, the main flow passageway having an air inlet and a cross sectional flow area, wherein the shroud section and the hub section are configured such that the cross sectional flow area of the main flow passageway decreases downstream of the air inlet to define a throat section and then increases downstream of the throat section to define a separation section;
a splitter disposed downstream of the throat section and extending into the separation section to divide the main flow passageway, downstream of the throat section, into a scavenge flow path and an engine flow path;
a shroud suction flow passage having a shroud suction inlet port and a shroud suction outlet port, the shroud suction inlet port extending through the shroud section and in fluid communication with the separation section, the shroud suction outlet port in fluid communication with the scavenge flow path; and
a hub suction flow passage having a hub suction inlet port and a hub suction outlet port, the hub suction inlet port disposed upstream of the throat section and extending through the hub section and in fluid communication with the air inlet, the hub suction outlet port extending through the splitter and in fluid communication with the scavenge flow path.

15. The system of claim 14, further comprising an air pump in fluid communication with the scavenge flow path and configured to draw air through the scavenge flow path, the shroud suction flow passage, and the hub suction flow passage.

16. The system of claim 14, wherein the hub section inlet port is disposed adjacent the air inlet.

17. The system of claim 14, wherein
the hub suction inlet port is disposed downstream of the air inlet.

18. The system of claim 14, further comprising:
a hub suction scoop extending from the hub section and disposed adjacent the hub suction inlet port; and
a shroud section scoop extending from the shroud section and disposed adjacent the shroud suction inlet port.

* * * * *